(12) United States Patent
Fujioka et al.

(10) Patent No.: US 10,947,352 B2
(45) Date of Patent: Mar. 16, 2021

(54) STRUCTURE MATERIAL AND MANUFACTURING METHOD THEREFOR

(71) Applicant: TORAY INDUSTRIES, INC., Tokyo (JP)

(72) Inventors: Takashi Fujioka, Ehime (JP); Yoshiki Takebe, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/471,949

(22) PCT Filed: Dec. 20, 2017

(86) PCT No.: PCT/JP2017/045789
§ 371 (c)(1),
(2) Date: Jun. 20, 2019

(87) PCT Pub. No.: WO2018/117180
PCT Pub. Date: Jun. 28, 2018

(65) Prior Publication Data
US 2019/0382543 A1 Dec. 19, 2019

(30) Foreign Application Priority Data

Dec. 22, 2016 (JP) .............................. JP2016-248746

(51) Int. Cl.
*C08J 5/04* (2006.01)
*B29C 70/06* (2006.01)
(Continued)

(52) U.S. Cl.
CPC ............... *C08J 5/042* (2013.01); *B29C 70/06* (2013.01); *B29K 2305/00* (2013.01);
(Continued)

(58) Field of Classification Search
CPC .... C08J 5/042; C08J 2323/12; C08J 2423/30; Y10T 428/26; Y10T 428/24479;
(Continued)

(56) References Cited

U.S. PATENT DOCUMENTS

| | | |
|---|---|---|
| 4,229,397 A | 10/1980 | Fukuta et al. |
| 4,770,929 A | 9/1988 | Nobumasa et al. |

(Continued)

FOREIGN PATENT DOCUMENTS

| | | | |
|---|---|---|---|
| JP | 54-109422 A | 8/1979 | |
| JP | 58-53298 A | 3/1983 | |

(Continued)

OTHER PUBLICATIONS

International Search Report, issued in PCT/JP2017/045789, dated Mar. 20, 2018.
(Continued)

*Primary Examiner* — Catherine A Simone
(74) *Attorney, Agent, or Firm* — Birch, Stewart, Kolasch & Birch, LLP

(57) ABSTRACT

Provided is a mountain-shaped structure material being excellent in stiffness and lightness. The present invention is a structure material including a resin, reinforced fibers and voids. The structure material has a specific bending stiffness represented as $Ec^{1/3} \cdot \rho^{-1}$ being 2.5 or more where a bending modulus is Ec and a density is ρ. The structure material has a mountain shape.

10 Claims, 6 Drawing Sheets

(51) Int. Cl.
*B29K 305/00* (2006.01)
*B29K 307/04* (2006.01)
*B29L 31/00* (2006.01)

(52) U.S. Cl.
CPC ... *B29K 2307/04* (2013.01); *B29L 2031/7724* (2013.01); *C08J 2323/12* (2013.01); *C08J 2423/30* (2013.01); *Y10T 428/26* (2015.01)

(58) Field of Classification Search
CPC ............ B29K 2305/00; B29K 2307/04; B29L 2031/7724; B29C 70/06
See application file for complete search history.

(56) References Cited

U.S. PATENT DOCUMENTS

| | | | |
|---|---|---|---|
| 2011/0143110 A1* | 6/2011 | Tsuchiya | B29C 70/08 428/213 |
| 2014/0030491 A1 | 1/2014 | Sakai et al. | |
| 2016/0214346 A1 | 7/2016 | Hatanaka et al. | |
| 2019/0039329 A1 | 2/2019 | Sakai et al. | |

FOREIGN PATENT DOCUMENTS

| | | | |
|---|---|---|---|
| JP | 58-77399 | A | 5/1983 |
| JP | 62-38712 | B2 | 8/1987 |
| JP | 2001-268686 | A | 9/2001 |
| JP | 2001-306062 | A | 11/2001 |
| JP | 2006-63149 | A | 3/2006 |
| JP | 2007-269308 | A | 10/2007 |
| JP | 2011-114409 | A | 6/2011 |
| JP | 2014-508055 | A | 4/2014 |
| JP | 2015-140353 | A | 8/2015 |
| WO | WO 2015/029634 | A1 | 3/2015 |

OTHER PUBLICATIONS

Written Opinion of the International Searching Authority, issued in PCT/JP2017/045789, dated Mar. 20, 2018.
Extended European Search Report for European Application No. 17884819.8, dated Jun. 22, 2020.

* cited by examiner

STRUCTURE MATERIAL AND MANUFACTURING METHOD THEREFOR

TECHNICAL FIELD

The present invention relates to a mountain-shaped structure material having a resin, reinforced fibers and voids, and a method for manufacturing the same.

BACKGROUND ART

In recent years, market demands for improvement in stiffness and lightness are increasing year by year for industrial products such as automobiles, aircraft, and sporting products. Furthermore, structure materials having various shapes and structure materials having high homogeneity are required. To meet these demands, fiber-reinforced plastics excellent in stiffness and lightness are widely used for various kinds of industrial applications. Specifically, a structure material in which a material made of continuous fibers in which reinforced fibers are arranged in one direction is laminated is studied (Patent Document 1). In order to satisfy lightness, a structure material in which voids are formed by foaming of a foamable resin, and a structure material in which reinforced fibers are removed after molding to form voids are also studied (see Patent Documents 2 and 3). In addition, a structure material in which voids are formed utilizing spring-back (restoring force) of a mat, using the non-woven mat made of reinforced fibers, is also studied (Patent Document 4).

PRIOR ART DOCUMENTS

Patent Documents

Patent Document 1: Japanese Patent Laid-open Publication No. 2001-306062
Patent Document 2: Japanese Patent Laid-open Publication No. 2006-63149
Patent Document 3: Japanese Examined Patent Application Publication No. S62-38712
Patent Document 4: Japanese Unexamined Patent Application Publication No. 2014-508055

SUMMARY OF THE INVENTION

Problems to be Solved by the Invention

However, in a structure material including a material in which reinforced fibers are arranged in one direction, while very high mechanical properties are expressed in a direction of fiber, mechanical properties significantly deteriorate in an axial direction of fiber. In addition, it is difficult to shape continuous fibers into a complicated shape. For this reason, product design, such as material arrangement, is important, and design freedom is limited. Also, although a structure material including a foamable resin is excellent in view of shaping a shape, a material which is not originally required is inevitably contained, thus decrease in mechanical properties of the structure material cannot be avoided. When removing fibers after molding, it may be easy if the shape is simple, whereas when it is a complicated shape, it is difficult to form voids by removing the fibers and it is difficult to express original properties, thus the shape is limited to some extent. Although a structure material including spring-back of a non-woven mat expresses relatively high mechanical properties, it is inferior in view of lightness. When intending to improve lightness, it is inferior in mechanical properties. From the foregoing circumstances, a pressing need is to provide a structure material excellent in stiffness and lightness.

Thus, the present invention has been made in view of the above problems, and an object thereof is to provide a mountain-shaped structure material excellent in stiffness and lightness.

Solutions to the Problems

The present invention is (1) as below.
(1) A structure material having a resin, reinforced fibers and voids,
a specific bending stiffness represented as $Ec^{1/3} \cdot \rho^{-1}$ being 2.5 or more where a bending modulus is Ec and a density is $\rho$, and
the structure material having a mountain-shaped side surface.

Effects of the Invention

The structure material according to the present invention can provide a mountain-shaped structure material excellent in stiffness and lightness.

EMBODIMENTS OF THE INVENTION

Figure 1:
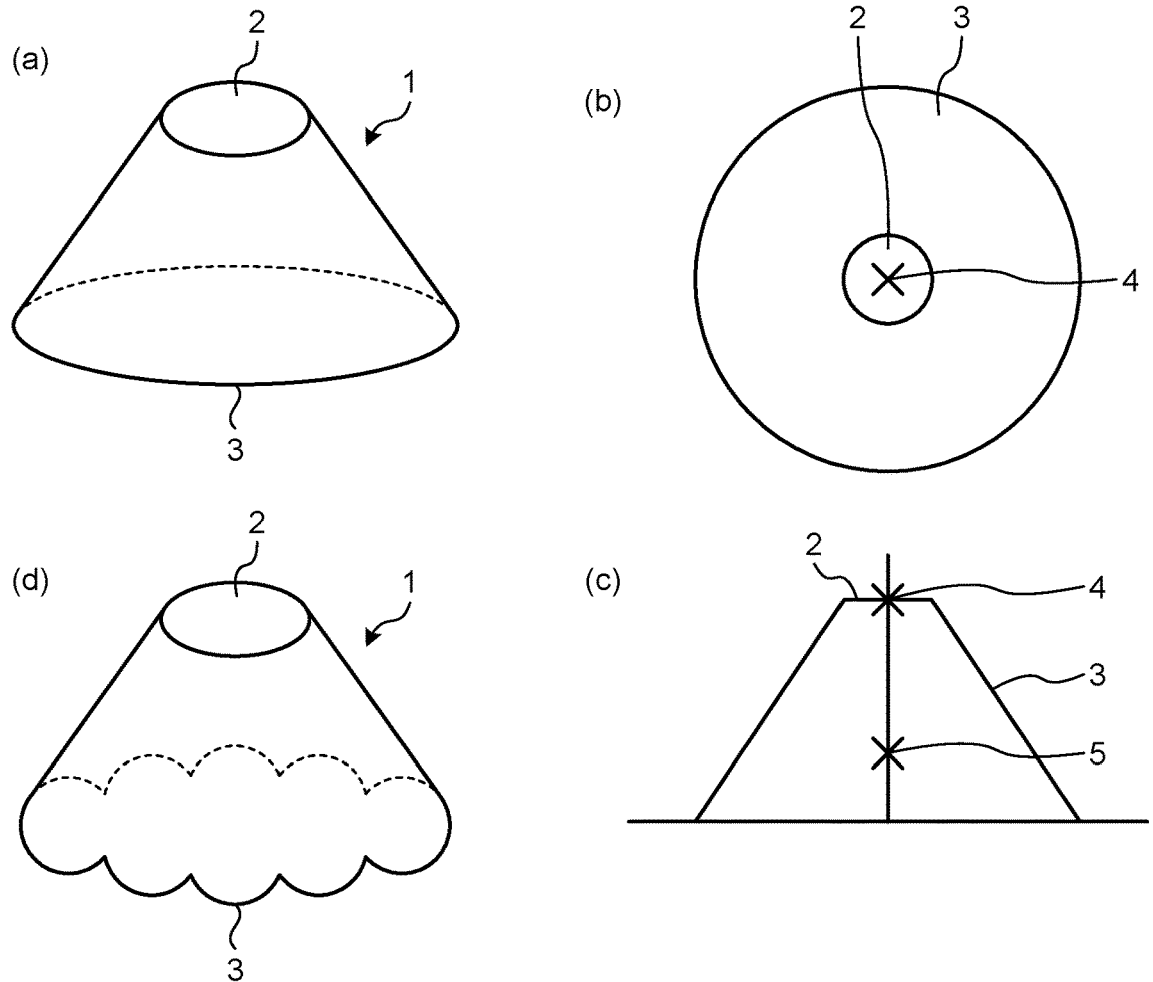
FIG. 1 shows schematic views of a structure material according to an embodiment of the present invention.

Hereinafter, the structure material according to the present invention will be described.
FIG. 1(a) is a schematic perspective view of a structure material 1 according to an embodiment of the present invention, FIG. 1(b) is a top view of the structure material 1, and FIG. 1(c) is a side view of the structure material 1. As shown in FIG. 1(a), the structure material 1 according to the embodiment of the present invention has a mountain shape. Specifically, it has a circular top surface 2 and a truncated cone-shaped side surface 3 in contact with an outer periphery of the top surface 2. The top surface 2 and the side surface 3 have predetermined thicknesses, and the space surrounded by the top surface 2 and the side surface 3 is a cavity. The "mountain shape" herein refers to a shape which has an expansion from a center of the structure material toward an outside of the structure material with a certain inclination, for example, it is a cone or a truncated cone. At this time, the side surface 3 is continuously formed from an entire outer periphery of a vertex 4 (see FIG. 4(a)) or the top surface (see FIG. 1(a)). The length from the top surface 2 (or the vertex 4) to the other end of the side surface 3 is not particularly limited, but is preferably the same in view of shape balance. In view of imparting design and properties, the side surface 3 may have a partially different length from the top surface 2 (or the vertex 4) to the other end of the side surface 3, and the shortest part has a length of preferably 30% or more, and more preferably 50% or more of the longest part (see FIG. 1(d)).

Figure 3:
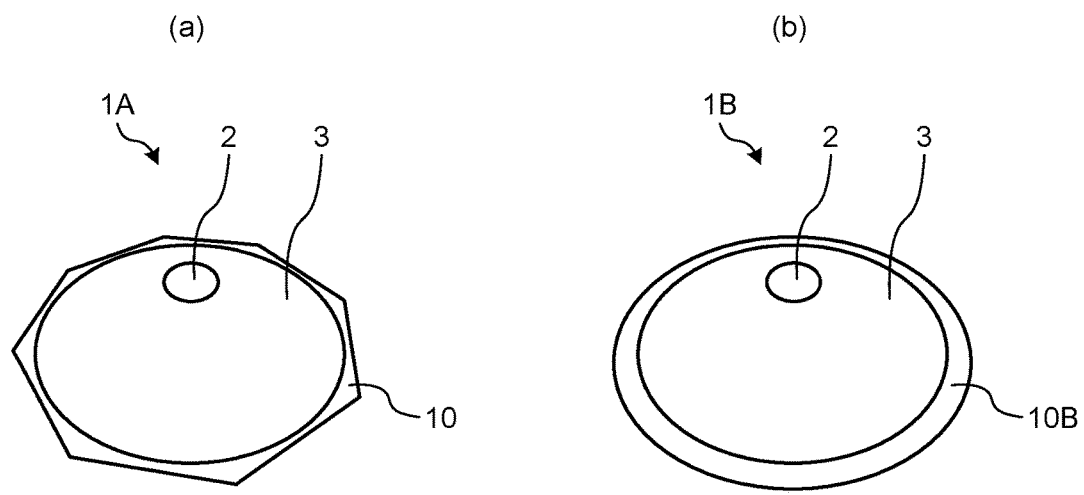
FIG. 3 shows schematic perspective views of structure materials according to other examples of embodiments of the present invention.

The mountain shape in the structure material of the present invention may be a shape selected from, in addition to the truncated cone shown in the structure material 1, truncated hemispherical, truncated polygonal pyramid, or cone, hemispherical and polygonal pyramid without the top surface 2. When the bottom surface shape is a circle, the mountain shape is cone or truncated cone, and when the bottom surface shape is a polygon such as triangle, quadrilateral or hexagonal, the mountain shape is polygonal pyramid or truncated polygonal pyramid. In view of enhancing stiffness of the structure material, the mountain shape is preferably polygonal pyramid or truncated polygonal pyramid having an angle, among which regular polygonal pyramid or regular truncated polygonal pyramid whose bottom surface is a regular polygon which is line symmetric is more preferred. In view of homogeneity of the structure material, the mountain shape is preferably selected from cone, truncated cone, hemispherical or truncated hemispherical whose bottom surface of the structure material is a circle which is point symmetric. Further, the structure material of the present invention may have a shape shown in FIG. 3 FIG. 3 shows schematic perspective views of structure materials 1A and 1B according to other examples of embodiments of the present invention. The structure material 1A has a flange 10 extending from the side surface 3, in addition to the top surface 2 and the side surface 3. In the structure material 1A, the shape of the bottom surface of the side surface 3 is a circle, the shape of the bottom surface of the flange 10 is an octagon, and in the structure material 1B, the shape of the bottom surface of the flange 10 is circular.

The "bottom surface of the structure material" herein refers to, for example, in the structure material 1 of Embodiment 1, as shown in FIG. 1(b), a contact surface between the structure material 1 and a floor surface when a horizontal projected area (an area when observed from the height direction (top surface) of the mountain shape) of the side surface 3 of the structure material 1 is maximized, and a center of gravity 5 in a vertical plane of projection (a plane vertical to the horizontal plane of projection and having the maximum area) of the side surface 3 of the structure material 1 is defined as the floor surface side, which is a lower surface (bottom surface) of FIG. 1.

Figure 2:
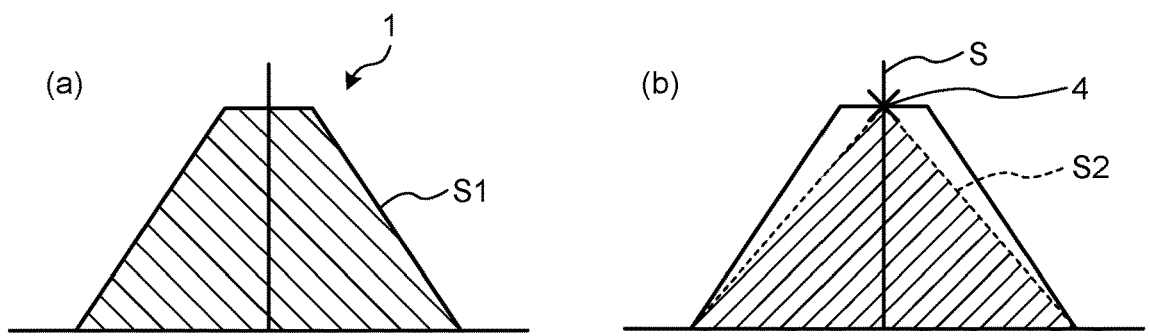
FIG. 2 shows diagrams illustrating a structure of a structure material according to an embodiment of the present invention.

FIG. 2 shows diagrams illustrating the structure of the structure material 1 according to Embodiment 1 of the present invention. It is desired that, in the shape (sectional shape) of the structure material of the present invention, the ratio of S1 to S2 (S1/S2) is 0.3 to 1.7 where, as shown in FIG. 2(a), an area of the vertical plane of projection of the structure material 1 is S1, and as shown in FIG. 2(b), an area of a triangle formed by the vertex 4 of the vertical plane of projection of the structure material 1 and the bottom surface is S2. In view of ease of shaping the mountain shape, the ratio is preferably 0.5 to 1.6, and further preferably 0.8 to 1.5. The "vertex 4 of the vertical plane of projection of the structure material" herein refers to an intersection (vertex 4) of a vertical line S connecting the bottom surface to the center of gravity 5 of the vertical plane of projection in the vertical plane of projection (the mountain-shaped section) as shown in FIG. 1(c) and the highest position of the structure material 1. The area of a triangle connecting the vertex 4 and both ends of the bottom surface is S2. When the ratio of S1 to S2 (S1/S2) is smaller than 0.3, the vertical plane of projection of the structure material 1 is T-shaped, which may make it difficult to shape the shape and may make mechanical properties nonuniform. When the ratio (S1/S2) is larger than 1.7, the vertical plane of projection of the structure material 1 may be large.

Figure 4:
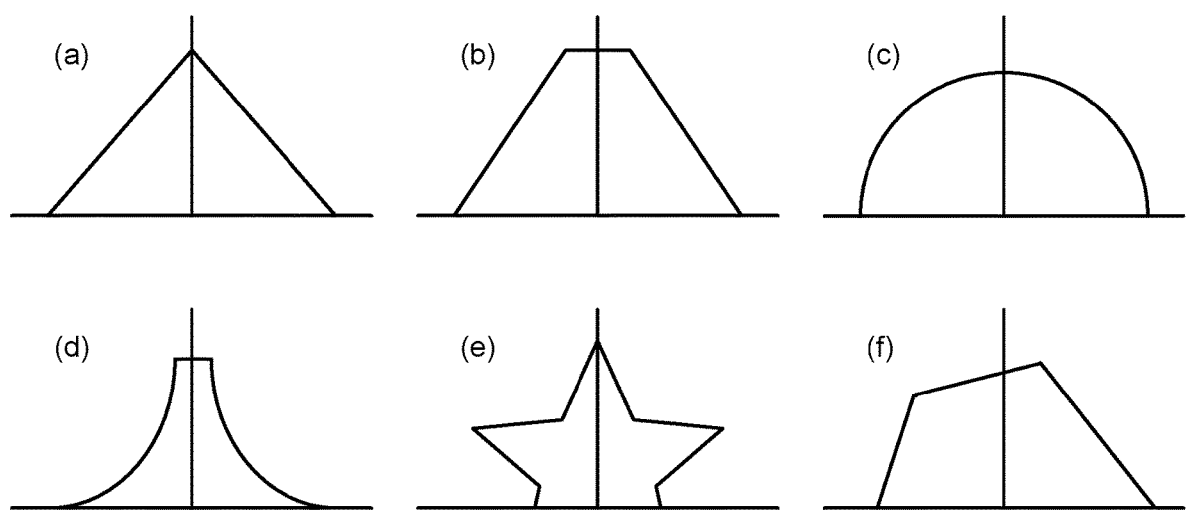
FIG. 4 shows schematic side diagrams of the structure materials according to other examples of embodiments of the present invention.

As shown in FIG. 4, the sectional shape in the direction of the side surface of the mountain shape includes (a) triangle, (b) trapezoid, and the like. Also, an oblique side of the mountain shape is not limited to a straight line, and may be a curve. When it is a curve expanding upward, the sectional shape will be a semicircle as shown in FIG. 4(c), and when it is a curve expanding downward, the sectional shape includes a shape as shown in FIG. 4(d) and the like. Furthermore, when it is a line having a plurality of vertexes on the oblique side, the sectional shape also includes a shape as shown in FIG. 4(e) and the like. At this time, it does not necessarily have to be line symmetric, and the shape as shown in FIG. 4(f) is also one of the sectional shapes of a mountain shape.

Figure 5:
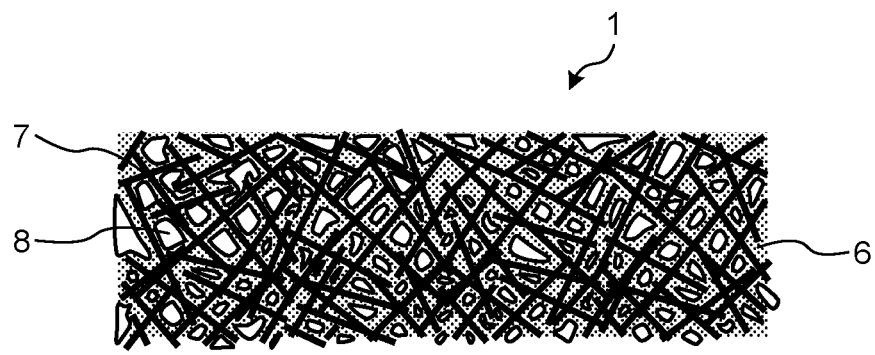
FIG. 5 shows a schematic diagram of an enlarged sectional structure of the structure material according to the embodiment of the present invention.

FIG. 5 shows a schematic diagram of an enlarged sectional structure of the structure material 1 according to the present invention. As shown in FIG. 5, the structure material 1 according to the present invention is composed of a resin 6, reinforced fibers 7 and voids 8.

Here, examples of the resin 6 include thermoplastic resins and thermosetting resins. Also, in the present invention, a thermosetting resin and a thermoplastic resin may be blended with each other.

In one mode of the present invention, the resin 6 desirably contains at least one or more thermoplastic resins. Examples of the thermoplastic resin include thermoplastic resins selected from crystalline plastics such as "polyesters such as polyethylene terephthalate (PET), polybutylene terephthalate (PBT), polytrimethylene terephthalate (PTT), polyethylene naphthalate (PEN), and liquid crystal polyesters; polyolefins such as polyethylene (PE), polypropylene (PP), and polybutylene; polyoxymethylene (POM), polyamide (PA), and polyarylene sulfides such as polyphenylene sulfide (PPS); polyketone (PK), polyether ketone (PEK), polyether ether ketone (PEEK), polyether ketone ketone (PEKK), polyether nitrile (PEN), and fluorine-based resins such as polytetrafluoroethylene; and liquid crystal polymers (LCP)", amorphous plastics such as "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based and other thermoplastic elastomers, and copolymers and modified products thereof. Among them, polyolefin is desirably used in view of the lightness of the obtained structure material 1, polyamide is desirably used in view of the strength thereof, amorphous plastics such as polycarbonate and styrene-based resins are desirably used in view of the surface appearance thereof, polyarylene sulfides are desirably used in view of heat resistance, polyether ether ketone is desirably used in view of the continuous use temperature thereof, and fluorine-based resins are desirably used in view of the chemical resistance thereof.

In one mode of the present invention, the resin 6 desirably contains at least one or more thermosetting resins. Examples of the thermosetting resin include unsaturated polyesters, vinyl esters, epoxy resins, phenol resins, urea resins, melamine resins, thermosetting polyimides, copolymers and modified products thereof, and resins obtained by blending at least two of these.

In addition, the structure material according to the present invention may contain, as one of the components of the resin 6, impact-resistant improvers such as elastomer and rubber components and other fillers and additive agents to the extent that the objects of the present invention are not impaired. Examples of the fillers and additive agents include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

The structure material 1 of the present invention preferably satisfies the following (1) to (3) when the volume content of the structure material 1 is defined as 100% by volume.

(1) The volume content of the resin 6 is 2.5 to 85% by volume (2) The volume content of the reinforced fibers 7 is 0.5 to 55% by volume (3) The volume content of the voids 8 is 10 to 97% by volume That is, the volume content of the resin 6 when the volume content of the structure material 1 is defined as 100% by volume is preferably within a range of 2.5% by volume or more and 85% by volume or less. When the volume content of the resin 6 is 2.5% by volume or more, it is possible to bind the reinforced fibers within the structure material 1 together to make the reinforcing effect of the reinforced fibers 7 sufficient and to satisfy the mechanical properties, especially bending modulus of the structure material 1, which is thus desirable. In contrast, when the volume content of the resin 6 is 85% by volume or less, it is preferable because formation of the voids 8 is not inhibited.

The structure material 1 of the present invention includes the reinforced fibers 7. Examples of the reinforced fibers 7 include metallic fibers formed of aluminum, brass, stainless, and the like, PAN-based, rayon-based, lignin-based, and pitch-based carbon fibers, graphite fibers, insulating fibers formed of glass and the like, organic fibers formed of aramid, PBO, polyphenylene sulfide, polyester, acrylic, nylon, polyethylene, and the like, and inorganic fibers formed of silicon carbide, silicon nitride, and the like. Further, surface treatment may be applied to these fibers. Examples of the surface treatment include, in addition to coating treatment with metal as a conductor, treatment with coupling agents, treatment with sizing agents, treatment with banding agents, adhesion treatment for additive agents, and the like. In addition, one of these fibers may be used alone, or two or more of them may be used in combination. Among them, PAN-based, pitch-based, and rayon-based carbon fibers, which are excellent in specific strength and specific stiffness, are desirably used in view of a weight reduction effect. Moreover, glass fibers are desirably used in view of increasing the economic efficiency of the obtained structure material 1, carbon fibers and glass fibers are desirably used in combination in view of a balance between mechanical properties and economic efficiency in particular. Furthermore, aramid fibers are desirably used in view of increasing the impact absorption and shaping properties of the obtained structure material 1, carbon fibers and aramid fibers are desirably used in combination in view of a balance between mechanical properties and impact absorption in particular. Further, metallic fibers made of metal having conductivity or reinforced fibers coated with metal such as nickel, copper or ytterbium can also be used in view of increasing the conductivity of the obtained structure material 1. Among these, reinforced fibers selected from the group consisting of metal fibers excellent in mechanical properties such as strength and elastic modulus, pitch-based carbon fibers and PAN-based carbon fibers can be more desirably used.

The reinforced fibers 7 are desirably discontinuous and dispersed in the structure material 1 in a random manner. In addition, the dispersion state is preferably in a nearly monofilament form. The reinforced fibers 7 are prepared in such a manner, whereby when a sheet-shaped precursor of the structure material 1 or the structure material 1 is molded by applying external force, shaping into a complex shape is made easy. Further, the reinforced fibers 7 are prepared in such a manner, whereby voids formed by the reinforced fibers 7 become fine, and weak parts at fiber bundle ends of the reinforced fibers 7 in the structure material 1 can be minimized, and thus giving isotropy in addition to excellent reinforcing efficiency and reliability.

Here, the nearly monofilament form indicates that a reinforced fiber single yarn is present as less than 500 fine-denier strands. The reinforced fibers 7 are further desirably dispersed in a monofilament form, that is, as a single yarn.

Being dispersed in a nearly monofilament form or monofilament form indicates that, for a reinforced fiber 7 freely selected in the structure material 1, the rate of single filaments having a two-dimensional contact angle of 1° or more (hereinafter, also referred to as a fibers dispersed rate) is 80% or more or, in other words, that a bundle in which two or more single filaments in the structure material 1 are in contact with each other to be parallel to each other is less than 20%. Consequently, the mass fraction of a fiber bundle with a filament number of 100 or less at least in the reinforced fibers 7 particularly preferably corresponds to 100%.

Furthermore, the reinforced fibers 7 are particularly desirably dispersed in a random manner. The reinforced fibers 7 being dispersed in a random manner refers to the fact that the arithmetic mean of a two-dimensional oriented angle of a reinforced fiber 7 freely selected in the structure material 1 is within a range of 30° or more and 60° or less. The two-dimensional oriented angle refers to an angle formed by a single filament of the reinforced fiber 7 and a single filament crossing this single filament and is defined as an angle on an acute angle side within a range of 0° or more and 90° or less out of angles formed by the single filaments crossing each other.

Figure 6:
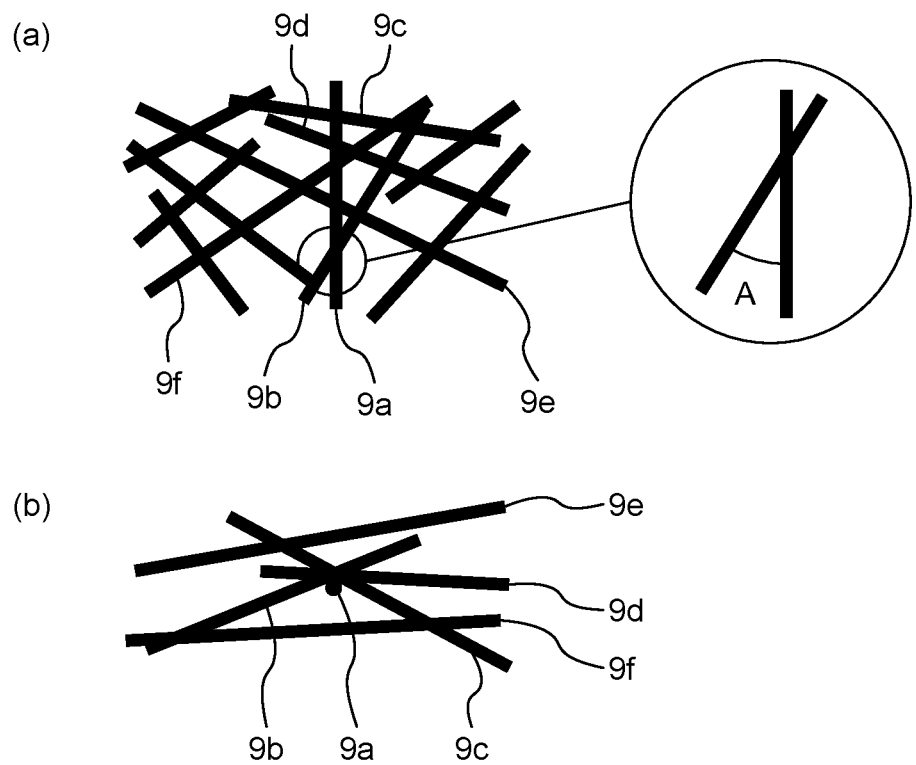
FIG. 6 shows schematic diagrams of an example of a dispersion state of reinforced fibers in a fiber-reinforced mat used in the embodiment of the present invention.

The two-dimensional oriented angle will be further described using the drawings. FIG. 6 shows schematic diagrams of an example of a dispersion state of reinforced fibers in a fiber-reinforced mat used in the present invention. FIG. 6(a) is a diagram viewed from a planar direction, and FIG. 6(b) is a diagram viewed from a thickness direction. In FIGS. 6(a) and 6(b), with reference to the single filament 9a, the single filament 9a crosses the other single filaments 9b to 9f. Here, the "crossing" means a state in which a single filament as a reference is observed to cross other single filaments on a two-dimensional plane observed, does not necessarily require the single filament 9a and the single filaments 9b to 9f to be in contact with each other, and does not exclude a state in which the single filament 9a is observed to cross the single filaments 9b to 9f when viewed in a projected manner. That is, focusing on the single filament 9a as the reference, all the single filaments 9b to 9f are objects for which the two-dimensional oriented angle is evaluated, and in FIG. 6(a), the two-dimensional oriented angle is the angle A on the acute angle side within a range of 0° or more and 90° or less out of the two angles formed by the two crossing single filaments.

A method for measuring the two-dimensional oriented angle is not particularly limited, and a method can be exemplified that observes the orientation of the reinforced fibers 7 from a surface of the structure element, for example, for which means similar to the method for measuring the two-dimensional contact angle described above can be employed. The mean of the two-dimensional oriented angle is measured by the following procedure. Specifically, the mean of the two-dimensional oriented angle is measured for all the single filaments (the single filaments 9b to 9f in FIG. 6) crossing a single filament selected at random (the signal filament 9a in FIG. 6). For example, when there are a large number of other single filaments crossing a single filament, an arithmetic mean measured by selecting 20 other crossing single filaments at random may be substituted. This measurement is repeated a total of five times with reference to other single filaments, and its arithmetic mean is calculated as the arithmetic mean of the two-dimensional oriented angle.

The reinforced fibers 7 are dispersed in a nearly monofilament form and in a random manner, whereby the performance given by the reinforced fibers 7 dispersed in a nearly monofilament form described above can be increased to the maximum. In addition, isotropy can be imparted to the mechanical properties in the structure material 1. In view of the foregoing, the fibers dispersed rate of the reinforced fibers 7 is desirably 90% or more and more desirably closer to 100%. Also, the arithmetic mean of the two-dimensional oriented angle of the reinforced fibers 7 is desirably within a range of 40° or more and 50° or less and more desirably closer to 45°, which is an ideal angle.

On the other hand, examples of the reinforced fibers 7 not having a non-woven fabric-like form include a sheet substrate, a woven fabric substrate, and a non-crimped substrate in which the reinforced fibers 7 are arranged in one direction. These forms arrange the reinforced fibers 7 regularly and densely, and thus there are few voids 8 in the structure material 1, which makes impregnation of the resin 6 extremely difficult and may form an unimpregnated part or significantly restrict alternatives of impregnating means and resin type.

The form of the reinforced fibers 7 may be any of a continuous reinforced fiber having a length similar to that of the structure material 1 and a discontinuous reinforced fiber with a finite length cut into a certain length, and it is desirably a discontinuous reinforced fiber in view of easily impregnating the resin 6 or being able to easily adjust the amount of the resin 6.

A longer of the mass mean fiber length of the reinforced fibers 7 is desirably within a range of 1 mm or more and 15 mm or less. With this length, the reinforcing efficiency of the reinforced fibers 7 can be increased, and thus excellent mechanical properties can be imparted to the structure material 1. When the longer of the mass mean fiber length of the reinforced fibers 7 is 1 mm or more, it is possible to form the voids in the structure material 1 efficiently, thus the density can be reduced, and in other words, it is possible to obtain a lightweight structure material even with the same thickness, which is thus desirable. In contrast, when the longer of the mass mean fiber length of the reinforced fibers 7 is 15 mm or less, the reinforced fibers 7 are unlikely to bend by their self-weight in the structure material 1, and the expression of mechanical properties is not inhibited, which is thus desirable. The resin component of the structure material 1 is removed by a method such as burning or eluting, 400 remaining reinforced fibers 7 are selected at random, and the lengths thereof are measured down to 10 µm, and the longer of the mass mean fiber length can be calculated as the longer of the mass mean fiber length thereof.

The volume content of the reinforced fibers 7 when the volume content of the structure material 1 is defined as 100% by volume is preferably within a range of 0.5% by volume or more and 55% by volume or less. When the volume content of the reinforced fibers 7 is 0.5% by volume or more, it is possible to make the reinforcing effect derived from the reinforced fibers 7 sufficient, which is thus desirable. In contrast, when the volume content of the reinforced fibers 7 is 55% by volume or less, the volume content of the resin 6 relative to the reinforced fibers 7 is relatively high, and it is possible to bind the reinforced fibers 7 within the structure material 1 together to make the reinforcing effect of the reinforced fibers 7 sufficient and to satisfy the mechanical properties, especially flexural properties of the structure material 1, which is thus desirable.

The reinforced fibers 7 are coated with the resin 6, in which the thickness (coating thickness) of the resin 6 is preferably within a range of 1 µm or more and 15 µm or less. As to the coated state of the reinforced fibers 7 coated with the resin 6, coating at least intersection points of the single filaments of the reinforced fibers 7 contained in the structure material 1 is sufficient in view of the shape stability of the structure material 1 and the easiness and the degree of freedom in thickness control, and as a more desirable manner, the resin 6 is desirably coated around the reinforced fibers 7 with the above thickness. This state means that the surface of the reinforced fibers 7 is not exposed owing to the resin or, in other words, that the reinforced fibers 7 form an electric wire-shaped coating by the resin 6. This formation further causes the structure material 1 to have shape stability and makes expression of mechanical properties sufficient. In addition, as the coated state of the reinforced fibers 7 coated with the resin 6, the whole of the reinforced fibers 7 is not required to be coated, and it may be coated within a range in which the shape stability, the bending modulus, and the bending strength of the structure material 1 according to the present invention are not impaired.

The structure material 1 of the present invention has voids 8. Then, the voids 8 in the present invention each indicate a space formed by the reinforced fibers 7 coated with the resin 6 serving as columnar supported bodies and overlapping with each other or crossing each other. When a structure precursor in which the reinforced fibers 7 are impregnated with the resin 6 in advance is heated to obtain a structure material 1, for example, melting or softening of the resin 6 along with heating raises the reinforced fibers 7 to form the voids 8. This is based on a characteristic of the reinforced fibers 7 inside the structure precursor in a compressed state by pressurization rising by hair raising force caused by their elastic modulus.

Moreover, when the volume content of the structure material 1 is defined as 100% by volume, the volume content of the voids 8 is preferably within a range of 10% by volume or more and 97% by volume or less. When the content of the voids 8 is less than 10% by volume, the density of the structure material 1 is low, thus lightness can be satisfied, which is thus desirable. In contrast, when the content of the voids 8 is 97% by volume or less, in other words, the thickness of the resin 6 coated around the reinforced fibers 7 is sufficient, thus it is possible to perform the reinforcing of the reinforced fibers 7 in the structure material 1 sufficiently to enhance mechanical properties, which is thus desirable. The upper limit of the volume content of the voids 8 is desirably 97% by volume. In the present invention, as to the volume content, the sum of the respective volume contents of the resin 6, the reinforced fibers 7, and the voids 8 included in the structure material 1 is defined as 100% by volume.

When the oriented angle of the reinforced fibers 7 in the sectional direction of the structure material 1 is θf, the oriented angle θf of the reinforced fibers 7 is desirably 60° or less, and more desirably 45° or less, in view of more effectively expressing the reinforcing function in the structure material 1. The oriented angle θf of the reinforced fibers 7 in the sectional direction of the structure material 1 is the degree of inclination relative to the sectional direction of the structure material 1, in other words, the degree of inclination of the reinforced fibers 7 relative to the thickness direction. A larger value indicates that the reinforced fibers 7 are inclined in an upright manner in the thickness direction, and the value is given within a range of 0° or more and 90° or less. Further, when the oriented angle θf of the reinforced fibers 7 is 3° or more, the reinforced fibers 7 in the structure material 1 are oriented in the thickness direction, in other words, in a three-dimensional manner, thus the degree of freedom in the structure material 1 is increased, and lightness can be satisfied, which is thus desirable. For this reason, the oriented angle θf of the reinforced fibers 7 is preferably 3° or more.

Figure 7:
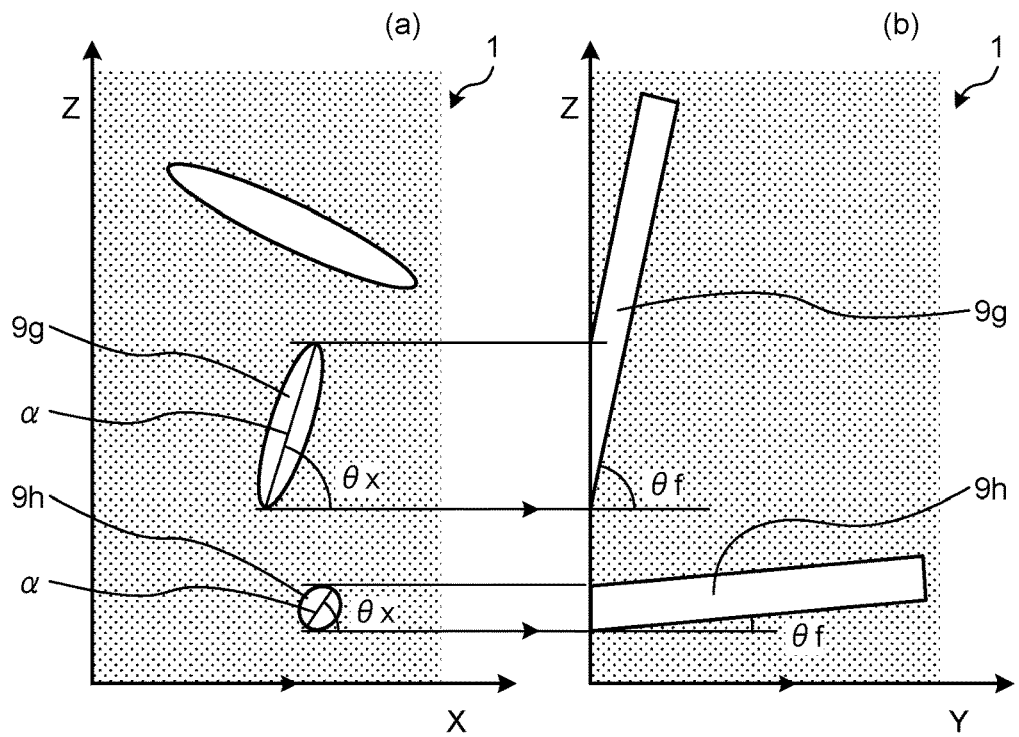
FIG. 7 shows schematic diagrams of an example of a sectional structure of the structure material according to the embodiment of the present invention.

The oriented angle θf of the reinforced fibers 7 can be measured based on observation of a perpendicular section relative to the planar direction of the structure material 1. FIG. 7 is a schematic diagram of an example of sectional structures of a surface formed in the thickness direction and the longitudinal direction of fiber (FIG. 7(a)) and a surface formed in the direction perpendicular to the thickness direction and the longitudinal direction of fiber (FIG. 7(b)) of the structure material 1 according to the present invention. In FIG. 7(a), the sections of single filaments 9g and 9h are approximated to an oval shape in order to simplify measurement. In the section of the single filament 9h, its aspect ratio of the oval (=oval major axis/oval minor axis) is viewed to be smaller, whereas in the section of the single filament 9g, its aspect ratio of the oval is viewed to be larger. Meanwhile, according to FIG. 7(b), the single filament 9h has an inclination nearly parallel relative to a planar direction Y, whereas the single filament 9g has a certain amount of inclination relative to the planar direction Y. In this case, as to the single filament 9g, an angle θx formed by a planar direction X of the structure material 1 and a fiber principal axis (the major axial direction in the oval) a is nearly equal to an oriented angle θf in the thickness direction of the single filament 9g. In contrast, as to the single filament 9h, there is a large deviation between the angle θx and the oriented angle θf, and it cannot be said that the angle θx is reflective of the oriented angle θf. Consequently, when the oriented angle θf is read from the perpendicular section relative to the planar direction of the structure material 1, the aspect ratio of the oval of a fiber section having a certain value or more is extracted, whereby the accuracy of detecting the oriented angle θf can be increased.

For an indicator of the aspect ratio of the oval to be extracted, a method can be employed that, when the sectional shape of the single filament is close to a perfect circle or, that is, when a fiber aspect ratio in a section perpendicular to the longitudinal direction of the reinforced fibers is 1.1 or less, the angle θx formed by the planar direction X and the fiber principal axis a is measured for the reinforced fibers having an aspect ratio of the oval of 20 or more, and this angle is employed as the oriented angle θf. In contrast, when the sectional shape of the single filament is an oval shape, a cocoon shape or the like, in which the fiber aspect ratio is larger than 1.1, it is better to focus on the reinforced fibers having a larger aspect ratio of the oval to measure the oriented angle θf, and the reinforced fibers having an aspect ratio of the oval of 30 or more when the fiber aspect ratio is 1.1 or more and less than 1.8, having an aspect ratio of the oval of 40 or more when the fiber aspect ratio is 1.8 or more and less than 2.5, and having an aspect ratio of the oval of 50 or more when the fiber aspect ratio is 2.5 or more may be selected, and the oriented angle θf thereof may be measured.

When the bending modulus of the structure material 1 is Ec and the density of the structure material 1 is ρ, the specific bending stiffness of the structure material 1 represented as $Ec^{1/3} \cdot \rho^{-1}$ is 2.5 or more. When the specific bending stiffness of the structure material 1 is 2.5 or more, the bending modulus is high, the density is low, and a desired weight reduction effect can be obtained, which is thus desirable. In contrast, the upper limit value of the specific bending stiffness of the structure material 1 is not particularly limited, but is desirably 20 or less, and an upper limit value of 20 or less is desirable in view of excellent balance between the weight reduction effect and the bending modulus. The specific bending stiffness of steel materials and aluminum is 1.5 or less in general, and the structure material 1 of the present invention having a specific bending stiffness of 2.5 or more has a specific bending stiffness extremely more excellent than these metallic materials. The structure material 1 of the present invention has a specific bending stiffness of 2.5 or more exceeding 2.3, which is a general specific bending stiffness of carbon fiber-reinforced plastic composite materials attracting attention for their weight reduction effect, and further desirably, the structure material 1 of the present invention has a specific bending stiffness of 5 or more.

In the structure material 1 of the present invention, it is preferable that the concentric circles homogeneity of the mountain shape is 20% or less, and desirably 10% or less. When the concentric circles homogeneity is 20% or less, unevenness of the mechanical properties in the concentric circles of a mountain shape is reduced, breakage of the structure material 1 can be suppressed, and the design freedom of the structure material 1 is further reduced. In addition, when the concentric circles homogeneity in the mountain shape is 20% or less, when the structure material is used for an acoustic member such as a diaphragm, it is possible to emit a uniform sound or a sound to be expressed.

Figure 8:
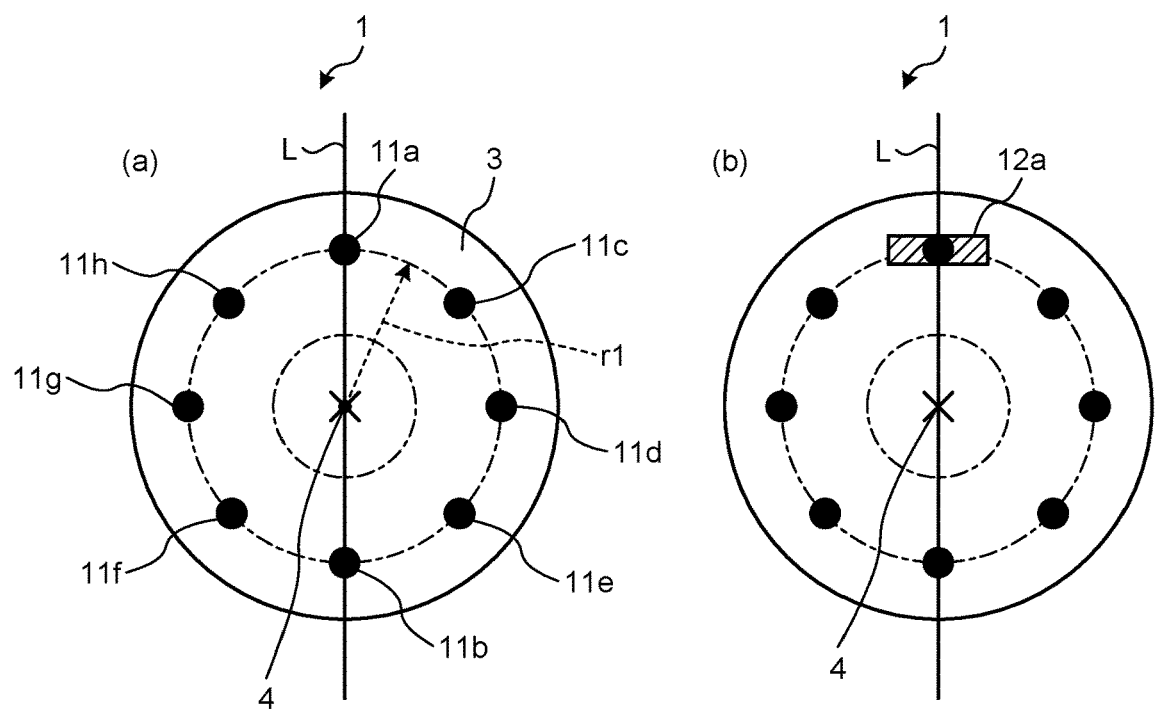
FIG. 8 shows schematic diagrams illustrating a concentric circles homogeneity of the structure material according to the embodiment of the present invention.

The "concentric circles homogeneity" referred herein indicates unevenness of the mechanical properties at equal distances r1 from the vertex 4, that is, positions on concentric circles, as shown in FIG. 8(*a*). There is no particular limitation on the method of measuring the concentric circles homogeneity, but for example, as shown in FIG. 8(*a*), a total of eight test pieces centering on intersections 11*a* and 11*b* of one straight line L passing through the vertex 4 and a concentric circle with a radius r1 centered on the vertex 4, and intersections 11*c*, 11*d*, 11*e*, 11*f*, 11*g* and 11*h* of a total of four straight lines passing through the vertex 4 inclined 45°, 90° and 135° from the straight line L, and the concentric circle with the radius r1 centered on the vertex 4 are cut out, for example, as shown at 12*a* of FIG. 8(*b*), and a bending test is performed using those test pieces. When a bending modulus at each position is Eci and an average bending modulus of all obtained data is Ec, the concentric circles homogeneity can be calculated from the obtained values of the bending modulus Eci, Ec and the following equation.

·Concentric circles homogeneity (%)=$\{\Sigma(Eci-Ec))^2/i\}^{0.5}/Ec \times 100$ $Eci$: Individual value of bending modulus ($i$=1, 2, . . . 8)(GPa)

$Ec$: Average bending modulus (GPa)

The bending modulus Ec of the structure material 1 is desirably 3 GPa or more, and more desirably 6 GPa or more. When the bending modulus Ec of the structure material 1 is 3 GPa or more, it is possible to expand the range used as the structure material 1, which is thus desirable. In addition, to facilitate the design of the structure material 1, the bending modulus Ec desirably has isotropy. While the upper limit of the bending modulus Ec is not limited, in general, in the structure material 1 having the reinforced fibers 7 and the resin 6, a value calculated from the respective elastic moduli of the reinforced fibers 7 and the resin 6 as the components can be the upper limit. In the structure material 1 according to the present invention, both when the structure material 1 is used alone and when it is used in combination with another member, a member is designed using the bending modulus of the structure material 1 itself, and 5 GPa is enough for practical use.

In the structure material 1 of the present invention, the radial homogeneity of the mountain shape may be intentionally changed, to the extent that the features of the present invention are not impaired. In view of obtaining the structure material 1 according to the purpose, for example, it is highly possible that an outer periphery of the bottom surface of the structure material 1 and a vicinity of the vertex 4 come into direct contact with a floor surface or the like when the structure material 1 is dropped, and it is also possible to soften the structure material 1 (lower elastic modulus) for the purpose of alleviating the impact, and make the other parts hard (higher elastic modulus) in order to express stiffness as the structure material 1. In contrast, even in the case of a reverse configuration, it is also possible to design so that the entire structure material 1 absorbs impact, and a portion which may be in contact is not broken.

In the structure material 1 of the present invention, it is preferable that the radial homogeneity of the mountain shape is 20% or less, and desirably 10% or less. When the radial homogeneity is unintentionally more than 20%, unevenness of the mechanical properties is caused in the mountain shape, and the design freedom of the structure material 1 may be reduced. In addition, there is also a case where it cannot be shaped into a target shape.

Figure 9:
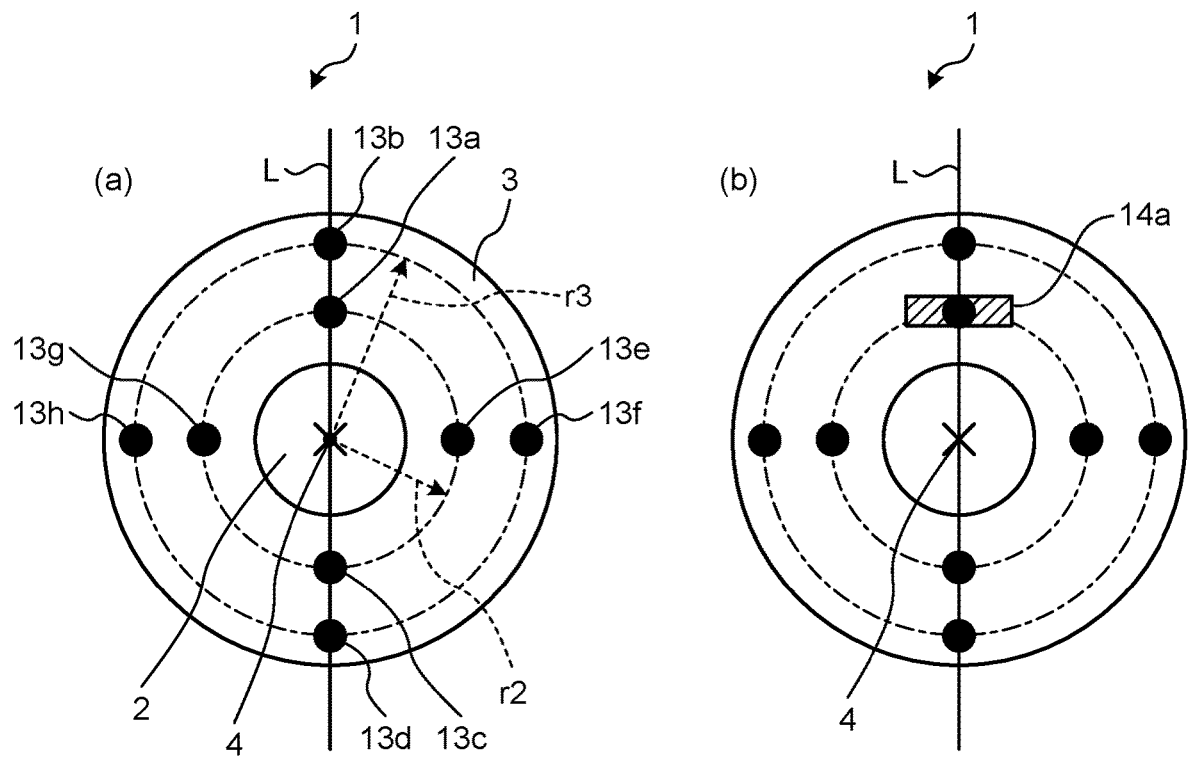
FIG. 9 shows schematic diagrams illustrating a radial homogeneity of the structure material according to the embodiment of the present invention.

The "radial homogeneity" referred herein indicates unevenness of the mechanical properties on the same radial line existing at different distances from the vertex when a line (radial line) is drawn from the vertex 4 to the bottom surface, as shown in FIG. 9(*a*). There is no particular limitation on the method of measuring the radial homogeneity, but for example, as shown in FIG. 9(*a*), a total of eight test pieces centering on intersections 13*a*, 13*b*, 13*c* and 13*d* of one straight line L (on the same radial line) passing through the vertex 4 and concentric circles with radiuses r2 and r3 centered on the vertex 4, and intersections 13*e*, 13*f*, 13*g* and 13*h* of another line passing through the vertex 4 perpendicular to the straight line L passing through the vertex 4 and the concentric circles with the radiuses r2 and r3 centered on the vertex 4 are cut out, for example, as shown at 14*a* of FIG. 9(*b*), and a bending test is performed using those test pieces. When a bending modulus at each position is Eri and the average bending modulus of all data obtained is Er, the radial homogeneity can be calculated from the obtained values of the bending modulus Eri, Er and the following equation.

·Radial homogeneity (%)=$\{\Sigma(Eri \times Er))^2/i\}^{0.5}/Er \times 100$ $Eri$: Individual value of bending modulus ($i$=1, 2, . . . 8)(GPa)

$Er$: Average bending modulus (GPa)

The thickness of the structure material 1 is desirably 0.2 mm or more. When the thickness is less than 0.2 mm, balance of the structure material 1 is lost, and when priority is given to stiffness, it is inferior in lightness, and when priority is given to lightness, it is inferior in stiffness. The thickness of the structure material 1 is more preferably 0.5 mm or more, and further preferably 1.0 mm or more, in view of the balance between stiffness and lightness. The upper limit of the thickness is not particularly limited, but is preferably 20 mm or less, and more preferably 10 mm or less, in view of mass of the structure material 1. The thickness of the structure material 1 herein refers to an average value of the thickness of the structure material 1 measured when evaluating specific bending stiffness of the structure material 1.

The density p of the structure material 1 is desirably 0.9 g/cm$^3$ or less. When the density p of the structure material 1 is 0.9 g/cm$^3$ or less, it means that mass as the structure material 1 decreases, and as a result, it contributes to reduction in mass when being made into a product, which is thus desirable. While the lower limit of the density is not limited, in general, in the structure material 1 having the reinforced fibers 7 and the resin 6, a value calculated from the respective volume ratios of the reinforced fibers 7, the resin 6 and the voids 8 as the components can be the lower limit. In the structure material 1 according to the present invention, while the density of the structure material itself is different depending on the reinforced fibers 7 and the resin 6 to be used, both when the structure material 1 is used alone or and when it is used in combination with another member, the density is desirably 0.03 g/cm$^3$ or more in view of maintaining the mechanical properties of the structure material 1.

The volume content of the voids 8 within 30% to a midpoint position in the thickness direction from surfaces of the structure material 1 is desirably within a range of 0% by volume or more and less than 10% by volume, and the volume content of the voids 8 of a residual part is desirably within a range of 10% by volume or more and 99% by volume or less. A smaller volume content of the voids 8 gives excellence in mechanical properties, whereas a larger volume content gives excellence in lightness. In other words, when the structure material 1 is formed of a material of the same composition, the volume content of the voids of the parts within 30% to the midpoint position in the thickness direction from the surfaces of the structure material 1 is 0% by volume or more and less than 10% by volume, thereby ensuring the mechanical properties of the structure material 1, and the volume content of the voids of the residual part is within a range of 10% by volume or more and 99% by volume or less, thereby satisfying lightness, which is thus desirable.

Figure 10:
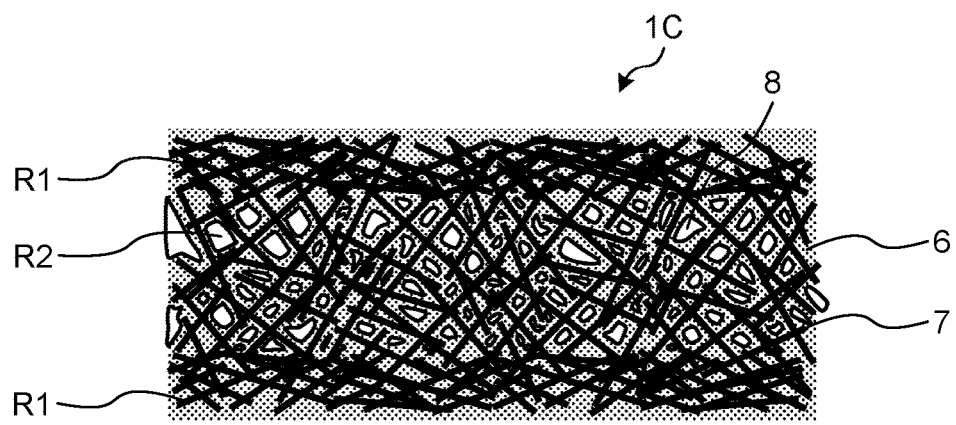
FIG. 10 shows an enlarged sectional diagram of the structure material according to another example of the embodiment of the present invention.

The thickness of the structure material 1 in the present invention can be determined by the shortest distance connecting one point on a surface and a surface on the back thereof for which the thickness is desired to be determined. The midpoint in the thickness direction means an intermediate point in the thickness of the structure material 1. The parts within 30% to the midpoint position in the thickness direction from the surfaces of the structure material 1 means parts containing up to 30% distance from the surfaces of the structure material 1 when the distance from the surfaces of the structure material 1 to its midpoint in the thickness direction is 100%. The residual part herein means a residual part after removing a part within 30% to the midpoint position in the thickness direction from one surface of the structure material 1 and a part within 30% to the midpoint position in the thickness direction from the other surface of the structure material 1. FIG. 10 shows an enlarged sectional diagram of a structure material 1C according to another example of the embodiment of the present invention. Parts R1 within 30% to the midpoint position in the thickness direction from the surfaces of the structure material 1 and a residual part R2 may be present at different positions in the thickness direction of the structure material 1C, as shown in FIG. 10.

The reinforced fibers 7 in the present invention desirably have a non-woven fabric-like form, in view of easiness of impregnation of the resin 6 into the reinforced fibers 7. Furthermore, the reinforced fibers 7 have a non-woven fabric-like form, whereby in addition to easy handleability of the non-woven fabric itself, impregnation can be made easy even in the case of thermoplastic resins, which are generally high in viscosity, which is thus desirable. The non-woven fabric-like form indicates a form in which strands and/or monofilaments of the reinforced fibers 7 are dispersed irregularly in a planar form, and examples thereof include a chopped strand mat, a continuous strand mat, a paper-making mat, a carding mat, an air-laid mat, and the like (hereinafter, collectively referred to as a fiber-reinforced mat).

Examples of a method for manufacturing the fiber-reinforced mat included in the structure material 1 include a method for manufacturing the fiber-reinforced mat by dispersing the reinforced fibers in a strand and/or a nearly monofilament form in advance. Examples of the method for manufacturing the fiber-reinforced mat include dry processes such as an air-laid method that forms the reinforced fibers 7 into a dispersion sheet with an airflow and a carding method that shapes the reinforced fibers 7 while mechanically carding them to form a sheet and a wet process by Radright method that stirs the reinforced fibers 7 in water to make paper as known techniques. Examples of means for making the reinforced fibers 7 closer to a monofilament form include, in the dry process, a method that provides fiber-opening bars, a method that vibrates fiber-opening bars, a method that makes meshes of a card finer, a method that adjusts a rotational speed of a card, and the like. Examples thereof include, in the wet process, a method that adjusts stirring conditions of the reinforced fibers 7, a method that dilutes a reinforced fiber concentration of a dispersion, a method that adjusts viscosity of a dispersion, a method that inhibits an eddy when a dispersion is transferred, and the like. In particular, the fiber-reinforced mat is desirably manufactured by the wet process, and the concentration of the reinforced fibers 7 is increased or the flow rate (flow) of a dispersion and the speed of a mesh conveyor are adjusted, whereby the rate of the reinforced fibers 7 in the fiber-reinforced mat can be easily adjusted. For example, the speed of the mesh conveyor is decreased relative to the flow rate of the dispersion, whereby the orientation of fibers in an obtained fiber-reinforced mat is difficult to be directed to a drawing direction, and a bulky fiber-reinforced mat can be manufactured. The fiber-reinforced mat may be formed of the reinforced fibers alone, the reinforced fibers 7 may be mixed with a matrix resin component in a powdery form or a fibrous form, the reinforced fibers 7 may be mixed with organic compounds or inorganic compounds, or the reinforced fibers 7 may be bonded to each other with a resin component. In these manufacturing methods, it is desirable that the obtained non-woven fabric-like reinforced fibers 7 have a mountain shape to be given to the structure material in advance. In view of improving homogeneity of the obtained structure material, it is desirable to make the fiber-reinforced mat into a mountain shape. Specifically, it can be obtained by using a mountain-shaped mold or mesh in the manufacturing process.

Furthermore, the fiber-reinforced mat can be also impregnated with the resin in advance to form a structure precursor. Examples of a method for manufacturing the structure precursor according to the present invention include a method that pressurizes or depressurizes the resin in a melted or softened state to the fiber-reinforced mat. Specifically, a method that heats and pressurizes a laminate arranging the resin from both sides in the thickness direction of the fiber-reinforced mat to melt-impregnate the resin can be desirably exemplified in view of the easiness of manufacture.

As equipment for implementing the methods, a compression molding machine or a double belt press can be suitably used. The former is for a batch type, and an intermittent type press system arranging two or more machines for heating and cooling in a row can improve productivity. The latter is for a continuous type, which can easily perform continuous processing and is thus excellent in continuous productivity.

In manufacturing the structure material according to the present invention, a manufacturing method including at least the following processes in this order is preferably employed in view of the easiness of manufacture and obtaining a structure material with high homogeneity.

Step [1]: a step of heating a fiber-reinforced plastic (structure precursor) containing at least a resin and reinforced fibers until a tensile strength of the resin becomes 10 MPa or less.

Step [2]: a step of applying pressure in a state where the fiber-reinforced plastic (structure precursor) is heated until the tensile strength of the resin becomes 10 MPa or less to shape a shape.

Step [3]: a step of expanding the fiber-reinforced plastic (structure precursor) by adjusting a thickness thereof.

Step [1] is a step of heating the fiber-reinforced plastic (structure precursor) used for molding. At this time, the structure precursor is preferably not expanded in view of handleability, and is preferably expanded in view of enhancing shaping properties.

Step [2] is a step of applying pressure to the heated fiber-reinforced plastic (structure precursor) to shape a shape. At this time, a tensile strength of the plastic of 10 MPa or less is preferable since the structure precursor is easy to be shaped into a target shape without tearing when applying pressure. The lower limit of the tensile strength of the plastic is not particularly limited, but it is preferably 1 MPa or more, in view of binding the fiber-reinforced plastic when shaping into a shape.

Step [3]: a step of expanding the fiber-reinforced plastic by adjusting a thickness thereof to form voids. A method for performing thickness control is not limited to a particular method so long as it can control the heated structure precursor to be a target thickness, and a method that restricts the thickness using metallic plates or the like, a method that performs thickness control by pressure given to the structure precursor and the like are exemplified as preferable methods in view of the easiness of manufacture. As equipment for implementing the methods, a compression molding machine or a double belt press can be suitably used. The former is for a batch type, and an intermittent type press system arranging two or more machines for heating and cooling in a row can improve productivity. The latter is for a continuous type, which can easily perform continuous processing and is thus excellent in continuous productivity.

Examples of the fiber-reinforced mat not having a non-woven fabric-like form include a sheet substrate, a woven fabric substrate, and a non-crimped substrate in which the reinforced fibers are arranged in one direction. These forms arrange the reinforced fibers regularly and densely, thus there are few voids in the fiber-reinforced mat, and the thermoplastic resin does not form a sufficient anchoring structure, thus bonding ability decreases. In addition, when the resin is a thermoplastic resin, impregnation is extremely difficult, which forms an unimpregnated part or significantly restricts alternatives of impregnating means and resin type.

In the present invention, to the extent that the features of the present invention are not impaired, a sandwich structure including the structure material or the structure precursor as a core layer and including an intermediate sheet material in which the reinforced fibers in a continuous form are impregnated with a resin as a skin layer is also feasible. The reinforced fibers in a continuous form are continuous with a length of 100 mm or more at least in one direction, and many are arranged in one direction to form an aggregate, or a so-called reinforced fiber bundle, which is continuous across the entire length of the sandwich structure. Examples of the form of the intermediate sheet material formed of the reinforced fibers in a continuous form are a woven fabric composed of reinforced fiber bundles formed of many reinforced fibers in a continuous form, a reinforced fiber bundle in which many reinforced fibers in a continuous form are arranged in one direction (a unidirectional fiber bundle), a unidirectional woven fabric composed of this unidirectional fiber bundle, and the like. The reinforced fibers may be composed of a plurality of fiber bundles of the same form or composed of a plurality of fiber bundles of different forms. The number of the reinforced fibers included in one reinforced fiber bundle is normally 300 to 48,000, and considering the manufacture of prepregs and the manufacture of woven fabrics, the number is desirably 300 to 24,000 and more desirably 1,000 to 12,000.

In the case of using a fiber-reinforced mat other than the non-woven fabric, in order to control the bending modulus $E_c$ of the structure material, a form in which the directions of the reinforced fibers are changed and laminated is desirably used. In particular, in order to efficiently increase the elastic modulus and strength of the sandwich structure material, continuous reinforced fibers (referred to as UD) in which fiber bundles are aligned in one direction are used to change the orientation direction of the reinforced fibers and laminate them.

Examples of the structure material include electric and electronic device parts such as "housings, trays, chassis, interior members, diaphragms, speaker cones or cases of personal computers, displays, OA devices, cellular phones, mobile information terminals, PDAs (mobile information terminals such as electronic notepads), video cameras, optical devices, audio devices, air conditioners, lighting devices, entertainment goods, toy goods, and other home appliances"; acoustic members such as "speaker cones"; "various kinds of members, various kinds of frames, various kinds of hinges, various kinds of arms, various kinds of wheel axles, various kinds of bearings for wheels, and various kinds of beams"; outer plates and body parts such as "hoods, roofs, doors, fenders, trunk lids, side panels, rear end panels, front bodies, under bodies, various kinds of pillars, various kinds of members, various kinds of frames, various kinds of beams, various kinds of supports, various kinds of rails, and various kinds of hinges"; exterior parts such as "bumpers, bumper beams, moldings, under covers, engine covers, current plates, spoilers, cowl louvers, and aerodynamic parts"; interior parts such as "instrument panels, seat frames, door trims, pillar trims, steering wheels, and various kinds of modules"; structure parts for automobiles and two-wheeled vehicles such as "motor parts, CNG tanks, and gasoline tanks"; parts for automobiles and two-wheeled vehicles such as "battery trays, headlamp supports, pedal housings, protectors, lamp reflectors, lamp housings, noise shields, and spare tire covers"; building materials such as "wall members such as sound insulation walls and soundproofing walls"; and parts for aircraft such as "landing gear pods, winglets, spoilers, edges, rudders, elevators, fairings, ribs, and seats". In view of mechanical properties and shaping properties, the structure material is desirably used for automobile interior and exterior, electric and electronic device housings, bicycles, structure materials for sporting goods, aircraft interior materials, boxes for transportation, and building materials. Among them, the structure material is particularly suitable for module members composed of a plurality of parts. In view of mechanical properties and homogeneity, it is desirably used for acoustic components such as diaphragms and speaker cones.

EXAMPLES

Hereinafter, the present invention will be described in more detail with reference to examples.

(1) Volume Content Vf of Reinforced Fibers in Structure Material

After a mass Ws of a structure material was measured, the structure material was heated at 500° C. for 30 minutes in the air to burn off a resin component, a mass Wf of remaining reinforced fibers was measured, and a volume content Vf was calculated by the following expression. At this time, the density of the reinforced fibers and the resin use the result of measurement according to a method of weighing in liquid of JIS Z8807 (2012).

$Vf$ (% by volume)$=(Wf/\rho f)/\{Wf/\rho f+(Ws-Wf)/\rho r\}\times 100$ $\rho f$: Density of reinforced fibers (g/cm$^3$)

$\rho r$: Density of resin (g/cm$^3$)

(2) Bending Test on Structure Material

Test pieces were cut out of the structure material, and the bending modulus was measured in accordance with ISO 178 Method (1993). As to the test pieces, test pieces cut out in four directions including a 0° direction freely set and +45°, −45°, and 90° directions were prepared. The number of measurement n=5 was set for each of the directions, and its arithmetic mean was defined as a bending modulus Ec. As to a measurement apparatus, "INSTRON" (registered trademark) model 5565 universal material testing system (manufactured by INSTRON JAPAN Co., Ltd.) was used. From the obtained result, the specific bending stiffness of the structure material was calculated by the following expression.

Specific bending stiffness$=Ec^{1/3}/\rho$ (3) Concentric Circles Homogeneity of Structure Material When a minimum distance from a vertex of the structure material to an end of a bottom surface was r, at intersections of any one straight line passing through a position r50 of 50% of the distance r from the vertex and the vertex and a total of four straight lines passing through the vertex inclined 45°, 90° and 135° from the straight line, a bending test was performed in the same manner as in the section (2). The bending modulus at the distance r50 was defined as Eci. Also, the average bending modulus of all data obtained was defined as Ec. The concentric circles homogeneity was calculated from the value of the obtained bending modulus and the following equation.

·Concentric circles homogeneity (%)$=\{\Sigma(Eci\times Ec))^2/i\}^{0.5}/Ec\times 100$ $Eci$: Individual value of bending modulus at distance $r50(i=1, 2, \ldots 8)$(GPa)

$Ec$: Average bending modulus at distance $r50$ (GPa)

(4) Radial Homogeneity of Structure Material

When a minimum distance from a vertex of the structure material to an end of a bottom surface was r, at intersections of a total of two straight lines of any one straight line passing through the vertex and a straight line inclined 90° from the straight line and a position r30 of 30% of the distance r from the vertex and a position r70 of 70% of the distance r from the vertex, a bending test was performed in the same manner as in the section (2). The bending modulus at each intersection was defined as Eri. Also, the average bending modulus of all data obtained was defined as Er. The radial homogeneity was calculated from the value of the obtained bending modulus and the following equation.

·Radial homogeneity (%)$=\{\Sigma(Eri-Er))^2/i\}^{-0.5}/Er\times 100$ $Eri$: Individual value of bending modulus at each position ($i=1, 2, \ldots 8$)(GPa)

$Er$: Average bending modulus at each position (GPa)

(5) Density ρ of Structure Material

A test piece was cut out of the structure material, and an apparent density of the structure material was measured with reference to JIS K7222 (2005). The dimensions of the test piece were 100 mm long and 100 mm wide. The length, width, and thickness of the test piece were measured with a micrometer, and a volume V of the test piece was calculated from the obtained value. Moreover, a mass M of the cut-out test piece was measured with an electronic balance. The obtained mass M and volume V were substituted into the following expression to calculate a density ρ of the structure material.

$\rho[g/cm^3]=10^3\times M$ [g]/V [mm$^3$]

(6) Volume Content of Voids of Structure Material

A test piece of 10 mm long and 10 mm wide was cut out of the structure material, and a section was observed with a scanning electron microscope (SEM) (model S-4800 manufactured by Hitachi High-Technologies Corporation) to photograph ten sites at regular intervals from the surface of the structure material with a 1,000-fold magnification. For each image, an area $A_a$ of voids within the image was determined. Furthermore, the area $A_a$ of the voids was divided by the area of the entire image to calculate a porosity. The volume content of the voids of the structure material was determined by an arithmetic mean from the porosity at a total of 50 sites photographed at ten sites each for five test pieces.

In the structure material, in order to determine a case when the porosity of a part to the midpoint position in the thickness direction from the surface and the porosity of the residual part are different from each other, the volume content of voids was calculated for each of the ten sites photographed at regular intervals, and the volume content of voids within a range of 0% by volume or more and less than 10% by volume and the volume content of voids within a range of 10% by volume or more and 99% by volume or less were separately determined.

(7) Volume Content of Resin in Structure Material

Using the values of the volume content of reinforced fibers and the volume content of voids in the structure materials determined by (1) and (6), the volume content of resin was determined by the following equation.

$Vr$ (% by volume) of resin$=100-(Vf+Va)$

Vf: Volume content of reinforced fibers (% by volume)
Va: Volume content of voids (% by volume)
The following materials were used in the examples and comparative examples below.
[Carbon Fiber 1]
A copolymer with polyacrylonitrile as a main component was subjected to spun processing, calcined processing, and surface oxidation treatment processing to obtain a continuous carbon fiber with a total single yarn number of 12,000. The properties of this continuous carbon fiber were as follows.

Single filament diameter: 7 μm
Density: 1.78 g/cm³
Tensile strength: 4600 MPa
Tensile modulus: 220 GPa

[PP Resin]

A resin sheet with a weight per unit area of 100 g/m² formed of 80% by mass of an unmodified polypropylene resin ("Prime Polypro" (registered trademark) J105G manufactured by PRIME POLYMER Co., Ltd.) and 20% by mass of an acid-modified polypropylene resin ("ADMER" QB510 manufactured by Mitsui Chemicals, Inc.) was prepared.

[PA Resin]

A resin film with a weight per unit area of 124 g/m² formed of a nylon 6 resin ("AMILAN" (registered trademark) CM1021T manufactured by Toray Industries, Inc.) was prepared.

[Fiber-Reinforced Mat 1]

Figure 11:
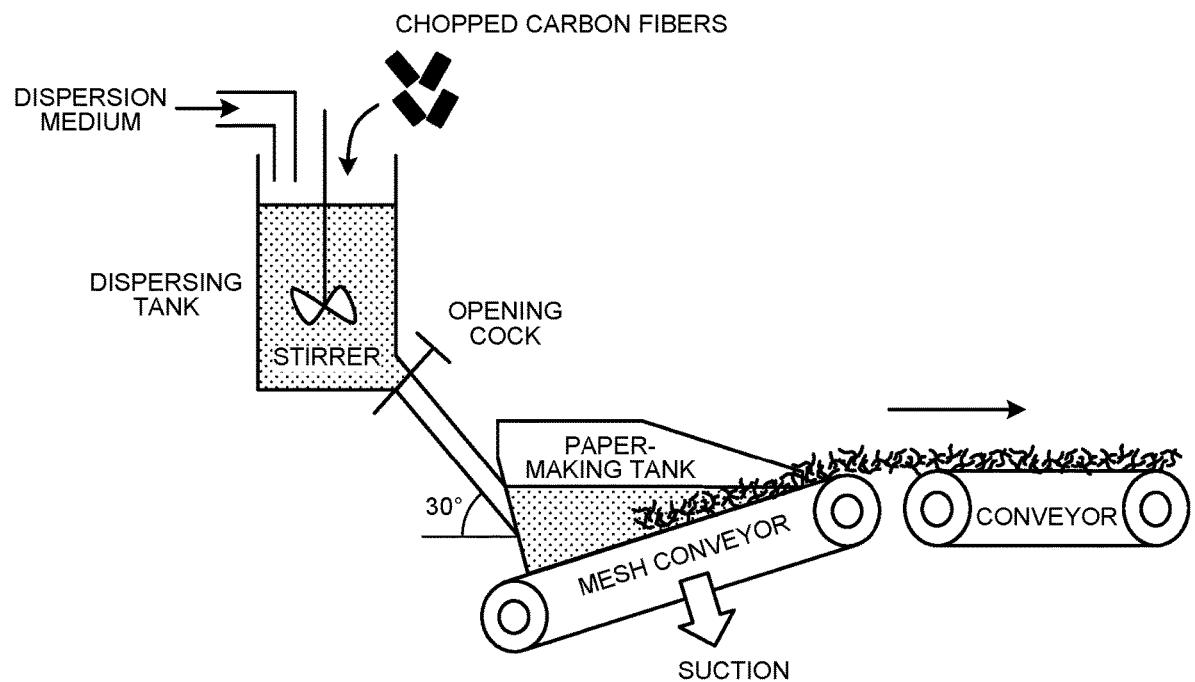
FIG. 11 shows a schematic diagram of an example of an apparatus for manufacturing a fiber-reinforced mat.

Carbon Fiber 1 was cut into 6 mm with a strand cutter to obtain chopped carbon fibers. A dispersion with a concentration of 0.1% by mass containing water and a surfactant (polyoxyethylene lauryl ether (product name) manufactured by nacalai tesque) was prepared. Using this dispersion and the chopped carbon fibers, a fiber-reinforced mat was manufactured using an apparatus for manufacturing a fiber-reinforced mat shown in FIG. 11. The manufacturing apparatus shown in FIG. 11 includes a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top surface of the dispersing tank, and the chopped carbon fibers and the dispersion (dispersion medium) can be charged from the opening. The paper-making tank includes a mesh conveyor having a paper-making face with a width of 500 mm on its bottom, and a conveyor that can convey a carbon fiber substrate (a paper-making substrate) is connected to the mesh conveyor. Paper making was performed with a carbon fiber concentration in the dispersion of 0.05% by mass. The carbon fiber substrate after paper making was dried in a drying oven at 200° C. for 30 minutes to obtain non-woven fabric-like Fiber-Reinforced Mat 1. The obtained weight per unit area was 50 g/m².

[Fiber-Reinforced Mat 2]

Non-woven fabric-like Fiber-Reinforced Mat 2 was obtained in the same manner as in Fiber-Reinforced Mat 1 except that Carbon Fiber 1 was cut into 3 mm with a strand cutter.

Example 1

A laminate was prepared in which Fiber-Reinforced Mat 1 as a fiber-reinforced mat and the PP resin as a resin sheet were arranged in order of [resin sheet/fiber-reinforced mat/resin sheet/fiber-reinforced mat/fiber-reinforced mat/resin sheet/fiber-reinforced mat/resin sheet]. Subsequently, a structure precursor was obtained through the following processes (I) through (IV).

(I) The laminate is arranged between platens of a press molding machine preheated at 230° C., and a mold is closed.
(II) Subsequently, after being maintained for 120 seconds, the mold is maintained for additional 60 seconds with a pressure of 3 MPa applied.
(III) After Process (II), the temperature of the platens is cooled to 50° C. with the pressure maintained.
(IV) The platens of the press molding machine is opened, and the structure precursor is taken out.

The obtained structure precursor was heated in an oven set at 200° C. for 3 minutes. The tensile strength when the PP resin was heated in an oven at 200° C. was measured in advance, to confirm that the tensile strength becomes 10 MPa or less by heating for 3 minutes or more, and the heating time was set to 3 minutes.

Subsequently, the structure precursor in the heated state was arranged in a mold set at a surface temperature of 230° C. at which the structure material shown in FIG. 1 could be molded, and a pressure of 3 MPa was applied. Thereafter, the mold was opened, a metal spacer was inserted at an end of the mold, the thickness at the time of obtaining the structure material was adjusted to be 1.68 mm, and the mold was fastened again. The mold surface temperature was cooled to 50° C. while maintaining a pressure of 3 MPa, and the mold was opened to take out a structure material. The properties of the structure material of Example 1 are shown in Table 1.

Example 2

A structure material was obtained in the same manner as in Example 1 except that a laminate was prepared in which Fiber-Reinforced Mat 1 as a fiber-reinforced mat and the PP resin as a resin sheet were arranged in order of [resin sheet/fiber-reinforced mat/resin sheet/fiber-reinforced mat/resin sheet/fiber-reinforced mat/resin sheet/fiber-reinforced mat/fiber-reinforced mat/resin sheet/fiber-reinforced mat/resin sheet/fiber-reinforced mat/resin sheet/fiber-reinforced mat/resin sheet]. The properties of the structure material of Example 2 are shown in Table 1.

Example 3

A structure material was obtained in the same manner as in Example 1 except that a laminate was prepared in which Fiber-Reinforced Mat 1 as a fiber-reinforced mat and the PP resin as a resin sheet were arranged in order of [resin sheet/fiber-reinforced mat/fiber-reinforced mat/resin sheet], and the thickness at the time of obtaining the structure material was adjusted to be 1.40 mm. The properties of the structure material of Example 3 are shown in Table 1.

Example 4

A structure material was obtained in the same manner as in Example 1 except that the mold used for molding was a hemispherical shape having a sectional shape as shown in FIG. 4(c). The properties of the structure material of Example 4 are shown in Table 1.

Example 5

A structure material was obtained in the same manner as in Example 1 except that the mold used for molding was a truncated square pyramid having a square bottom surface as shown in FIG. 4(b). The properties of the structure material of Example 5 are shown in Table 1.

Example 6

A structure material was obtained in the same manner as in Example 1 except that the mold used for molding was shaped as shown in FIG. 4(d). The properties of the structure material of Example 6 are shown in Table 2.

Example 7

A structure material was obtained in the same manner as in Example 1 except that the fiber-reinforced mat was changed from Fiber-Reinforced Mat 1 to Fiber-Reinforced Mat 2 to form a structure precursor. The properties of the structure material of Example 7 are shown in Table 2.

Example 8

A structure material was obtained in the same manner as in Example 1 except that the resin sheet was changed from PP resin to Ny resin to form a structure precursor, the temperature of the oven was 230° C., and the temperature of the mold was 260° C. The properties of the structure material of Example 8 are shown in Table 2.

Example 9

Using a carbon fiber reinforced epoxy resin (trade name: "TORAYCA" prepreg P3252S-10, Toray Industries, Inc.) and a foamed polypropylene sheet (trade name: EFCELL RC2010 (double foam, thickness 1.0 mm), FURUKAWA ELECTRIC CO., LTD.)) as materials, a layered article of [prepreg (0° direction)/prepreg (90° direction)/prepreg (0° direction/prepreg (90° direction)/EFCELL/prepreg (90° direction)/prepreg (0° direction)/prepreg (90° direction)/prepreg (0° direction)] was obtained. This layered article was arranged in a mold set at a surface temperature of 150° C., and a pressure of 0.5 MPa was applied. After maintaining the pressure for 30 minutes, the mold was opened to obtain a structure material. The properties of the structure material of Example 9 are shown in Table 2.

COMPARATIVE EXAMPLE 1

Materials were dry-blended at a ratio of 50% by mass of a glass fiber reinforced polypropylene resin (trade name: "mostron" L-3040P, Prime Polypro PRIME POLYMER Co., Ltd.) and 50% by mass of a foaming agent (trade name: Polythlene EE206, EIWA CHEMICAL IND.CO., LTD.), and injection molding was performed using a mold which becomes the same shape as the structure material of Example 1 at a cylinder temperature of 230° C. and a mold temperature of 50° C. to obtain a structure material. The properties of the structure material of Comparative Example 1 are shown in Table 3.

Comparative Example 2

A layered article obtained by laminating seven sheets of a carbon fiber reinforced epoxy resin (trade name: "TORAYCA" F6343B-05P, Toray Industries, Inc.) as a material was obtained. A structure material was obtained in the same manner as in Example 1 except that this layered article was used. The properties of the structure material of Comparative Example 2 are shown in Table 3.

TABLE 1

| | | | Example 1 | Example 2 | Example 3 | Example 4 | Example 5 |
|---|---|---|---|---|---|---|---|
| Structure Material | | | | | | | |
| Reinforced fiber | Fiber type | [—] | Carbon Fiber | Carbon Fiber | Carbon Fiber | Carbon Fiber | Carbon Fiber |
| | Volume content | [%] | 6.7 | 13.3 | 4.0 | 6.7 | 6.7 |
| | Fiber state | [—] | Nearly monofilament | Nearly monofilament | Nearly monofilament | Nearly monofilament | Nearly monofilament |
| | Dispersion state | [—] | Random | Random | Random | Random | Random |
| | Longer of mass mean fiber length | [mm] | 4.9 | 4.9 | 4.9 | 4.9 | 4.9 |
| Resin | Resin type | [—] | PP | PP | PP | PP | PP |
| | Volume content | [%] | 26.6 | 53.3 | 16.0 | 26.6 | 26.6 |
| Void | Volume content | [%] | 66.7 | 33.4 | 80.0 | 66.7 | 66.7 |
| Mountain shape | | [—] | Truncated cone-shaped | Truncated cone-shaped | Truncated cone-shaped | Hemispherical-shaped | Truncated square pyramid-shaped |
| Area ratio (S1/S2) | | [—] | 1.18 | 1.18 | 1.18 | 1.57 | 1.18 |
| Thickness | | [mm] | 1.68 | 1.68 | 1.40 | 1.68 | 1.68 |
| Property evaluation | | | | | | | |
| Bending stiffness | | [—] | 5.0 | 3.1 | 6.8 | 5.0 | 5.0 |
| Concentric circles homogeneity | | [%] | 5.0 | 2.7 | 6.1 | 4.9 | 4.8 |
| Bending modulus | | [GPa] | 5.8 | 11.0 | 3.4 | 5.8 | 5.8 |
| Radial homogeneity | | [%] | 4.9 | 2.8 | 7.9 | 4.8 | 4.9 |

TABLE 2

| | | | Example 6 | Example 7 | Example 8 | Example 9 |
|---|---|---|---|---|---|---|
| Structure Material | | | | | | |
| Reinforced fiber | Fiber type | [—] | Carbon Fiber | Carbon Fiber | Carbon Fiber | Carbon Fiber |
| | Volume content | [%] | 6.7 | 6.7 | 6.7 | 16.0 |
| | Fiber state | [—] | Nearly monofilament | Nearly monofilament | Nearly monofilament | Strand |

TABLE 2-continued

|  |  |  | Example 6 | Example 7 | Example 8 | Example 9 |
|---|---|---|---|---|---|---|
|  | Dispersion state | [—] | Random | Random | Random | Unidirectional |
|  | Longer of mass mean fiber length | [mm] | 4.9 | 2.6 | 4.9 | Continuous |
| Resin | Resin type | [—] | PP | PP | Ny | Epoxy resin |
|  | Volume content | [%] | 26.6 | 26.6 | 26.6 | 57.3 |
| Void | Volume content | [%] | 66.7 | 66.7 | 66.7 | 26.7 |
|  | Mountain shape | [—] | Truncated cone-shaped | Truncated cone-shaped | Truncated cone-shaped | Truncated cone-shaped |
|  | Area ratio (S1/S2) | [—] | 0.91 | 1.18 | 1.18 | 1.18 |
|  | Thickness | [mm] | 1.68 | 1.68 | 1.68 | 1.68 |
|  | Property evaluation |  |  |  |  |  |
|  | Bending stiffness | [—] | 5.0 | 4.2 | 3.8 | 2.8 |
|  | Concentric circles homogeneity | [%] | 5.0 | 4.6 | 4.3 | 23.1 |
|  | Bending modulus | [GPa] | 5.8 | 3.4 | 3.9 | 20.4 |
|  | Radial homogeneity | [%] | 5.2 | 4.5 | 4.4 | 87.1 |

TABLE 3

|  |  |  | Comparative Example 1 | Comparative Example 2 |
|---|---|---|---|---|
|  | Structure Material |  |  |  |
| Reinforced fiber | Fiber type | [—] | Glass Fiber | Carbon Fiber |
|  | Volume content | [%] | 6.7 | 46 |
|  | Fiber state | [—] | Nearly monofilament | Strand |
|  | Dispersion state | [—] | Random | Unidirectional (woven fabric) |
|  | Longer of mass mean fiber length | [mm] | 0.4 | Continuous |
| Resin | Resin type | [—] | PP | Epoxy resin |
|  | Volume content | [%] | 26.6 | 54 |
| Void | Volume content | [%] | 66.7 | 0 |
|  | Mountain shape | [—] | Truncated cone-shaped | Truncated cone-shaped |
|  | Area ratio (S1/S2) | [—] | 1.18 | 1.18 |
|  | Thickness | [mm] | 1.68 | 1.68 |
|  | Property evaluation |  |  |  |
| Bending stiffness | | [—] | 2.2 | 1.8 |
| Concentric circles homogeneity | | [%] | 22.3 | 10.5 |
| Bending modulus | | [GPa] | 2.6 | 20.3 |
| Radial homogeneity | | [%] | 11.3 | 6.2 |

[Consideration]

It is clear that Examples 1 to 9 are mountain-shaped structure materials satisfying the specific bending stiffness of the structure material. In Examples 1 to 3, it was shown that it is possible to intentionally change the specific bending stiffness, and the configuration can be changed according to the required properties. Examples 4 and 5 are mountain-shaped structure materials having different side surfaces or bottom surfaces, and Example 4 can exhibit uniform properties in all directions because it is point symmetric. Since Example 5 is a structure material having corners, the stiffness of the structure material could be enhanced. In Example 6, a structure material having a sectional shape with a steep slope could be obtained. It was possible to obtain a structure material in which the fiber length was changed in Example 7 and a structure material in which the resin was changed in Example 8. In Example 9, a structure material could be obtained in a sandwich configuration using continuous fibers. Furthermore, in Examples 1 to 8, concentric and/or radial homogeneity is excellent. On the other hand, in Comparative Example 1 and Comparative Example 2, the specific bending stiffness and the homogeneity were not satisfactory.

INDUSTRIAL APPLICABILITY

The present invention can provide a mountain-shaped structure material excellent in stiffness and lightness. Furthermore, a structure material excellent in homogeneity can be provided.

DESCRIPTION OF REFERENCE SIGNS

1: Structure material
2: Top surface
3: Side surface
4: Vertex
5: Center of gravity
6: Resin
7: Reinforced fiber
8: Void
9: Single filament
10: Flange

The invention claimed is:

1. A structure material having a mountain shape, the structure material comprising a resin, reinforced fibers and voids,
wherein
the structure material has a specific bending stiffness represented as $Ec^{1/3} \cdot \rho^{-1}$ being 2.5 or more where a bending modulus is Ec and a density is $\rho$; and
a ratio of S1 to S2 (S1/S2) is 0.3 to 1.7, wherein S1 is the area of a vertical plane of a projection of the structure material, and S2 is the area of a triangle formed by a vertex of the vertical plane of a projection of the structure material and the structure material bottom surface.

2. The structure material according to claim 1, wherein a concentric circles homogeneity in the mountain shape is 20% or less.

3. The structure material according to claim 1, wherein the mountain shape is a shape selected from the group consisting of a cone shape, a hemispherical shape, a polygonal pyramid shape, a truncated cone shape, a truncated hemispherical shape, and a truncated polygonal pyramid shape.

4. The structure material according to claim 1, wherein the bending modulus (Ec) is 3 GPa or more.

5. The structure material according to claim 1, wherein a radial homogeneity in the mountain shape is 20% or less.

6. The structure material according to claim 1, wherein a thickness of the structure material is 0.2 mm or more.

7. The structure material according to claim 1, satisfying the following (1) to (3):
(1) a volume content of the resin is 2.5 to 85% by volume;
(2) a volume content of the reinforced fibers is 0.5 to 55% by volume; and
(3) a volume content of the voids is 10 to 97% by volume.

8. The structure material according to claim 1, wherein the reinforced fibers are in a nearly monofilament form, are dispersed in the structure material in a random manner, and have a non-woven form composed of discontinuous reinforced fibers having a longer of a mass mean fiber length of 1 to 15 mm.

9. The structure material according to claim 1, wherein the reinforced fibers are any one selected from the group consisting of metal fibers, pitch-based carbon fibers, and PAN-based carbon fibers.

10. A method for manufacturing a structure material having a mountain shape, the structure material comprising a resin, reinforced fibers and voids,
wherein
the structure material has a specific bending stiffness represented as $Ec^{1/3} \cdot \rho^{-1}$ being 2.5 or more where a bending modulus is Ec and a density is $\rho$; and
a ratio of S1 to S2 (S1/S2) is 0.3 to 1.7, wherein S1 is the area of a vertical plane of a projection of the structure material, and S2 is the area of a triangle formed by a vertex of the vertical plane of a projection of the structure material and the structure material bottom surface, and
wherein the method comprises at least the following steps in this order:
Step [1]: a step of heating a fiber-reinforced plastic (structure precursor) containing at least a resin and reinforced fibers until a tensile strength of the resin becomes 10 MPa or less;
Step [2]: a step of applying pressure in a state where the fiber-reinforced plastic (structure precursor) is heated until the tensile strength of the resin becomes 10 MPa or less to shape a shape; and
Step [3]: a step of expanding the fiber-reinforced plastic (structure precursor) by adjusting a thickness thereof.

* * * * *